(12) United States Patent
Muenz et al.

(10) Patent No.: US 7,736,743 B2
(45) Date of Patent: Jun. 15, 2010

(54) HEAT CURABLE, THERMALLY EXPANDABLE COMPOSITION WITH HIGH DEGREE OF EXPANSION

(75) Inventors: Xaver Muenz, Heidelberg (DE); Larissa Bobb, Leimen (DE)

(73) Assignee: Henkel KGaA, Duesseldorf (DE)

( * ) Notice: Subject to any disclaimer, the term of this patent is extended or adjusted under 35 U.S.C. 154(b) by 878 days.

(21) Appl. No.: 11/183,605

(22) Filed: Jul. 18, 2005

(65) Prior Publication Data

US 2006/0188726 A1   Aug. 24, 2006

Related U.S. Application Data

(63) Continuation of application No. PCT/EP2004/000391, filed on Jan. 20, 2004.

(30) Foreign Application Priority Data

Jan. 22, 2003   (DE)   ............................ 103 02 298

(51) Int. Cl.
  B32B 27/38   (2006.01)
  B32B 5/18    (2006.01)
  C08L 63/00   (2006.01)
  C08J 9/04    (2006.01)
  C08J 9/12    (2006.01)
  B29C 45/03   (2006.01)
  B29C 47/00   (2006.01)

(52) U.S. Cl. ................ 428/413; 264/257; 264/259; 264/313; 264/316; 264/328.1; 264/328.2; 264/328.6; 264/328.14; 264/328.17; 264/328.18; 264/343; 264/345; 264/347; 264/348; 521/79; 521/82; 521/178; 523/400; 523/427; 523/428; 523/466; 525/524

(58) Field of Classification Search .................. None
See application file for complete search history.

(56) References Cited

U.S. PATENT DOCUMENTS

| | | | |
|---|---|---|---|
| 4,199,486 A | 4/1980 | Boessler et al. | |
| 4,444,818 A | 4/1984 | Tominaga et al. | |
| 4,543,383 A | 9/1985 | Heil et al. | |
| 4,769,391 A | 9/1988 | Wycech | |
| 4,861,097 A | 8/1989 | Wycech | |
| 4,900,601 A | 2/1990 | Halg et al. | |
| 4,901,500 A | 2/1990 | Wycech | |
| 4,978,562 A | 12/1990 | Wycech | |
| 5,274,006 A | 12/1993 | Kagoshima et al. | |
| 5,290,857 A | 3/1994 | Ashida et al. | |
| 5,336,312 A * | 8/1994 | Byrne et al. ............. | 106/479 |
| 5,389,435 A | 2/1995 | Yap | |
| 5,453,453 A | 9/1995 | Lamon et al. | |
| 5,804,608 A | 9/1998 | Nakazato et al. | |
| 6,015,865 A | 1/2000 | Blank et al. | |
| 6,040,350 A | 3/2000 | Fukui | |
| 6,090,232 A | 7/2000 | Seeliger et al. | |
| 6,348,513 B1 | 2/2002 | Hilborn et al. | |
| 6,403,222 B1 | 6/2002 | Harrison | |
| 6,403,668 B1 | 6/2002 | Yoshino | |
| 6,479,560 B2 | 11/2002 | Freitag et al. | |
| 6,573,309 B1 | 6/2003 | Reitenbach et al. | |
| 6,811,864 B2 | 11/2004 | Czaplicki et al. | |
| 6,846,559 B2 | 1/2005 | Czaplicki et al. | |
| 2004/0048078 A1 | 3/2004 | Czaplicki et al. | |
| 2004/0058181 A1* | 3/2004 | Garnault et al. ......... | 428/539.5 |
| 2004/0221953 A1 | 11/2004 | Czaplicki et al. | |
| 2004/0266898 A1 | 12/2004 | Kassa et al. | |
| 2004/0266899 A1 | 12/2004 | Muenz et al. | |
| 2005/0103422 A1 | 5/2005 | Kawaguchi | |

FOREIGN PATENT DOCUMENTS

| | | |
|---|---|---|
| CA | 2005 735 | 6/1990 |
| CA | 2 241 037 | 7/1997 |
| DE | 27 22 752 A1 | 11/1978 |
| EP | 0 030 590 B1 | 2/1983 |
| EP | 0 030 999 B1 | 9/1985 |
| EP | 0 230 666 A2 | 8/1987 |
| EP | 0 376 880 A2 | 7/1990 |
| EP | 0 297 036 B1 | 12/1991 |
| EP | 0 298 024 B2 | 6/1996 |
| EP | 0 500 009 B1 | 7/1996 |
| EP | 0 899 300 A2 | 3/1999 |
| EP | 0 798 062 B1 | 12/2001 |
| WO | WO 89/08678 A1 | 9/1989 |
| WO | WO 93/00381 A1 | 1/1993 |
| WO | WO 95/27000 A1 | 10/1995 |
| WO | WO 96/37400 A1 | 11/1996 |
| WO | WO 98/15594 A1 | 4/1998 |
| WO | WO 00/52086 A2 | 9/2000 |
| WO | WO 02/48277 A1 * | 6/2002 |
| WO | WO 02/49836 A1 | 6/2002 |

OTHER PUBLICATIONS

Product Data for: Nipol Liquid Nitrile Elastomers (no date); http://www.zeonchemicals.com/print.aspx?id=89793859.*
Product Data for: Hycar Reactive Liquid Polymers (no date).*

* cited by examiner

*Primary Examiner*—Michael J Feely
(74) *Attorney, Agent, or Firm*—Mary K. Cameron

(57) ABSTRACT

Compositions containing at least one liquid epoxy resin, at least one solid epoxy resin, at least one propellant, at least one curing agent and at least one mica-containing filler produce expandable, thermally curable binder systems which may be used without the addition of hollow glass beads for the production of stiffening and reinforcing laminates and for the production of stiffening and reinforcing moldings. Said laminates according to the invention are suitable for the stiffening and reinforcing of components, in particular in the automotive industry, such as car body frames, doors, boot lids, engine bonnets and/or roof parts. In addition, the mouldings that may be produced from said binders are suitable for the stiffening and reinforcing of hollow metal structures, in particular of hollow car body parts such as body frames, body supports and posts or doors in the automotive industry.

22 Claims, No Drawings

HEAT CURABLE, THERMALLY EXPANDABLE COMPOSITION WITH HIGH DEGREE OF EXPANSION

CROSS-REFERENCE TO RELATED APPLICATIONS

This application is a continuation under 35 USC Sections 365(c) and 120 of International Application No. PCT/EP2004/000391, filed 20 Jan. 2004 and published 5 Aug. 2004 as WO 2004/065485, which claims priority from German Application No. 10302298.8, filed 22 Jan. 2003, each of which is incorporated herein by reference in its entirety.

FIELD OF THE INVENTION

The invention relates to expandable, thermally curable compositions based on epoxy resins, which exhibit a high degree of expansion, and a process for the stiffening and/or reinforcing of components with thin-walled structures, in particular car body components in vehicle construction.

BACKGROUND OF THE RELATED ART

Lightweight components for a consistently true-to-size mass production with high stiffness and structural strength are required for many areas of application. In vehicle construction, in particular, because of the saving in weight required, there is a high requirement for lightweight components made of thin-walled structures that nevertheless possess sufficient stiffness and structural strength. One method of achieving high stiffness and structural strength, despite the lowest possible weight of the component, calls for hollow parts that are made of relatively thin plate or plastics panels. Thin-walled plates, however, are prone to slight deformation. It has therefore already been known for some time, in the case of cavity structures, to foam out said cavity with a structural foam, whereby on the one hand the deformation or distortion is prevented or minimised, and on the other the strength and stiffness of said parts is enhanced. As regards two-dimensional parts of car bodies such as doors, roof parts, engine bonnets or boot lids, it is also known to enhance the stiffness and strength of said parts by layered laminates based on expandable or non-expandable epoxy resins or polyurethane resins being applied to said parts and connected firmly to the latter.

Conventionally, either such foamed reinforcing and stiffening means are metal foams or they contain a thermally curable resin or binder such as epoxy resins. Said compositions contain as a rule a propellant, fillers and reinforcing fillers such as hollow microbeads made of glass. Preferably such foams have in the foamed-up and cured state a density of 0.3 to 0.7 g/cm$^3$. Said foams are to withstand without harm, for at least a short period of time, temperatures of more than 150° C., preferably more than 180° C. Such foamable, thermally curable compositions contain as a rule further constituents such as curing agents, process aids, stabilizers, dyes or pigments, optionally UV absorbers and adhesion-enhancing constituents.

When structural components of car bodies are stiffened with expandable thermally curable resin compositions, said resins are very often cured during the passage of the car bodies through the paint drying ovens. The curing temperatures applied in the painting process are relatively low and the temperature acting on the car body may be very irregularly distributed, so that the body exhibits colder parts during the passage through the painting oven, which in the case of some thermally expandable foams prevents a full expansion. In addition, the temperature profile within a painting oven is irregularly distributed (for example: the temperature in the bottom area may be significantly lower than in the roof area of the oven). This results in thermally curing foam parts in the bottom area of the vehicle body being exposed to relatively low curing temperatures. This means that thermally curable foamable compositions for the above-mentioned areas of application also have to exhibit a high degree of expansion at relatively low temperatures.

EP-A-0 798 062 proposes components of metallic foam material in which the metallic foam material is made from a metal powder and propellant and is optionally formed between solid metal plate parts in a press at high temperatures and high pressures. Such a process is suitable only for large-sized components that are produced separately outside the assembly line of a motor vehicle and then incorporated in the standard assembly process. The insertion and foaming up of metallic foam materials is not possible under the process conditions of a standard motor vehicle assembly line.

U.S. Pat. No. 4,978,562 describes a specifically light, reinforcing door bar of a composite material consisting of a metal tube which is partly filled with a specifically light polymer of cellular structure. It is proposed to mix curing resins based on epoxy resins, vinyl ester resins, unsaturated polyester resins and polyurethane resins with the corresponding curing agents, fillers and cell-forming agents in an extruder, to cure said mixture to a core and to insert it into the metal tube in such a way that the core is fixed in the tube by friction forces or mechanically. Alternatively the polymer core may be manufactured of liquid or pasty polymer material by casting and be pressed into the tube. Reactive, heat curable and thermally expandable mouldings are not disclosed.

U.S. Pat. No. 4,769,391 describes a preformed composite insertion part for insertion into a hollow structural member. Said insertion part contains a multiplicity of thermoplastic granules consisting of a mixture of a thermoplastic resin and non-expanded, expandable hollow microbeads and a matrix of expanded polystyrene, which holds the aforementioned granules. The thermoplastic resin of the granules may be a thermoplastic, such as a thermoplastic polyester for example, or it may be a heat curable epoxy resin. After the insertion of the part into the hollow body to be filled the component is heated to a temperature which produces a "vaporising" of the expanded polystyrene—vaporising means here the breakdown of the expanded polystyrene to a thin film or carbon black. At the same time the thermoplastic granules expand and cure in some cases, wherein cavities of greater or lesser size remain between the individual expanded granule particles as a function of the degree of expansion of the granules.

In a similar manner U.S. Pat. No. 4,861,097 and U.S. Pat. No. 4,901,500 describe specifically lightweight composite bars of foamed polymers and metallic structures for the reinforcing of vehicle doors. According to this teaching the polymer core part is first of all formed by the production of a liquid or pasty reinforcing material which is then injected or cast into a channel-type structure and then cured. Thereafter, said cured core part is inserted into the hollow metallic structure. Alternatively, the core may be preformed or precast by injection moulding and then inserted into the cavity.

WO 89/08678 describes a process and compositions for the reinforcing of structural elements in which the polymer reinforcing material is a two-component epoxy system in which the one component is a paste-type material based on epoxy resins and the second component is a mixture of fillers, a pigment and a liquid curing agent of pasty consistency. Directly prior to the charging of the reinforcing material into the hollow structure the two components are mixed, inserted into the hollow structure and cured, wherein the hollow structure may optionally be pre-heated.

WO 96/37400 describes a W-shaped reinforcing structure which contains a thermally expandable, resin-type material and prior to the curing is inserted into the hollow member to be reinforced. The reinforcing polymer matrix consists preferably of a single-component, paste-type system containing an epoxy resin, an acrylonitrile-butadiene rubber, fillers, high-strength glass beads, a curing agent as well as an accelerator and a propellant based on an azo compound or a hydrazide compound.

WO 98/15594 describes foamed products for applications in the automobile industry based on preferably liquid, two-component epoxy systems in which the one component consists of a liquid epoxy resin and metal carbonates or bicarbonates and the other component consists of pigments, optionally hollow microbeads and phosphoric acid. During the mixing of the two components said compositions cure with foaming up. Applications for the reinforcement or stiffening of hollow structures are not disclosed.

The polymeric materials of the aforementioned prior art are either not suitable for the production of preformed moulded parts which expand thermally at a later stage through heating and are also heat curable, or, if they are suitable, they have as a rule a highly tacky surface which leads to contamination of the bearing surfaces, and conversely binds dirt and dust. In addition, a tacky surface of said moulded parts prevents the handling and in particular the storage, e.g., the stacking, of several parts on top of one another. For this reason moulded parts of the state of the art are provided with a protective film which is removed immediately prior to use. Such protective films make the production and application of such moulded parts more expensive, however, particularly as the protective film has to be disposed of after removal, which causes additional costs.

In order to reduce the surface tack of such moulded parts, WO00/52086 proposes making heat curable, thermally expandable mouldings from a mixture consisting of at least one solid reactive resin, at least one liquid reactive resin and at least one reactive resin with a flexibilising effect, together with curing agents and/or accelerators or propellants. Said mouldings are suitable for the stiffening and/or reinforcement of thin-walled metal structures and for the stiffening of hollow lightweight metal constructions. Compared with known heat curable, thermally expandable mouldings, the mouldings are characterised according to the teaching of said document by improved dimensional stability in the uncured state and by low surface tack. The properties of processability and dimensional stability are achieved by the mixing of epoxy resins with different melting points. However, the reduced surface tack, for example, is always to be achieved only in a very narrowly defined temperature range, so that a formulation which is admittedly tack-free in the winter exhibits a highly tacky surface in the summer. Furthermore, said procedure calls for the use of large amounts of expensive resins and curing systems. Particularly as regards the low-cost production of such expandable mouldings by the injection moulding method, manufacturing and handling difficulties continually arise. This is undesirable in terms of the reliability of the manufacturing process.

U.S. Pat. No. 4,444,818 describes a thermally curable adhesive laminate which is composed of a heat curable resin layer in the form of a "prepreg" in which a reinforcing material is embedded. Said document further proposes attaching a flat-pressed tubular material to one side of the prepreg, which may assume its original tubular form again on the heating of the reinforcing laminate. The prepreg laminate may consist of two different, thermally curable resin layers. Epoxy resins are proposed as binders for the thermally curable layers of the prepreg. The tubular or hose-type member is to consist of polyethylene, ethylene-vinyl acetate copolymers, polypropylene, polystyrene or PVC or else nitrile rubber. The method of manufacture for such reinforcing laminates is cumbersome.

EP-A-230 666 describes a process for producing a single-component heat curable composition which on heating forms a Urethane-Epoxy-Silicon Interpenetrating Network (IPN) system. Said document proposes producing from said compositions metal-reinforcing laminates ("patches") which adhere directly to oil-containing metal surfaces such as oily steel plates. The IPN is to be formed by a polyepoxy compound, a blocked polyamine curing agent and a polyurethane prepolymer with extended chain in which some isocyanate groups of the prepolymer are blocked with a hydroxyfunctional polysiloxane.

EP-A-297 036 describes a laminate consisting of a support, e.g., resin-bonded glass fibre tissue, to which a layer of heat curable resin is applied. In order to protect the tacky resin surface, a covering foil of a material shrinking under the action of heat is provided. Said film is to be provided with slits which expand to an open position after a thermal pre-treatment, so that a part of the tacky surface is exposed. It is therefore no longer to be necessary to withdraw the protective film prior to the application of the laminate. No details are given on the composition of the tacky resin layer.

EP-A-376 880 describes a laminate arrangement for the stiffening of two-dimensional bodies incorporating a supporting layer of a curable synthetic resin material in which a reinforcing material connected to the latter or embedded in it is provided. In addition, an adhesive layer applied to the supporting layer and facing the member to be reinforced is provided, which incorporates a curable synthetic resin material provided optionally with fillers and other additives. In order to achieve as high a reinforcing effect as possible without deformation of the two-dimensional member (plate), the adhesive layer is to possess after the curing of the synthetic resin a higher modulus of elasticity than the cured synthetic resin material of the supporting layer, and at the same time supporting layer and adhesive layer are to exhibit in the cured state at least approximately the same coefficient of thermal expansion as the two-dimensional member to be stiffened. The supporting layer is to consist of a glass fibre tissue and a mixture of liquid epoxy resins and solid epoxy resins together with curing agents, the adhesive layer is to consist substantially of heat curable, self-adhesive synthetic resins, which are likewise made up of liquid and solid epoxy resins together with curing agents and fillers.

In a similar manner EP-A-298 024 describes a process for stiffening plates and plastics mouldings with the aid of a single- or multilayered two-dimensional stiffening member, in which at least one layer consists of a synthetic resin curable under the effect of heat. Said stiffening member is to be subjected first of all to a first thermal treatment in which at least one surface of the stiffening member becomes tacky as a result of said first thermal treatment. After this the stiffening member is to be applied with the tacky surface to the element to be stiffened and after this the stiffening member is to be subjected to a second thermal treatment until all the layers of the stiffening member are cured. It is proposed that one layer of the reinforcing member is composed of heat curable epoxy resins, which optionally contains glass fibre tissue. There Is proposed as a second layer, which is to become tacky during the first thermal treatment, a hot melt adhesive on an epoxy base, in certain cases on a polyurethane or copolyester base.

Alternatively said layer is to consist of a film shrinking under the effect of heat, so that a tacky layer is exposed after shrinkage.

WO 95/27000 describes a curable, injectable composition for the reinforcing of thin, rigid plates or panels. The composition is made up of heat curable resins, expandable hollow microbeads and particulate reinforcing material of ground glass fibres, ground carbon fibres and their mixtures. The various epoxy resins based on glycidyl ethers, glycidyl esters and glycidyl amines are proposed as heat curable resin compositions.

CA-A-2 241 073 describes a film-reinforcing stiffening laminate for rigid, thin-walled substrates. According to the teaching of said document the polymer is to cure in a paint oven with expansion and at the same time bond intimately with the inner surface of the base substrate to be reinforced. Details of the binder composition are not given in said document.

It follows from the documents cited above that substantially epoxy-based binder compositions or compositions based on polyurethanes are proposed for surface- or frame-stiffening laminates. Although as a rule the latter provide the required degree of stiffening, they do not meet the requirement for a chemical base which is acceptable in industrial hygiene and health terms. Reactive polyurethane systems still contain in almost all cases residues of monomeric diisocyanate. For this reason the workplaces where such compositions are used have to be fitted with suitable suction equipment, in order to be able to protect the persons employed in said workplaces against exposure to isocyanates. With epoxy-based systems on the one hand the dimensional stability is determined by the composition of the epoxy resin mixture, in which case an attempt is made to prevent or at least minimize the portion of liquid epoxy resins with a molecular weight of below 700, since said low molecular weight epoxy compounds may trigger allergic or sensitising reactions on skin contact. On the other hand, such uncured laminates or mouldings with a high proportion of liquid, low molecular weight epoxides exhibit a good adhesion to the substrates to be stiffened, but are less resistant to process fluids such as washing and cleaning baths, phoshatizing and conversion baths, and to electrophoretic paint. In particular the washing fluids are applied at high pressure and temperatures up to 75° C.

In order to obtain a high structural strength and in particular compressive strength in the case of mouldings with low specific weight, many of the above-mentioned documents propose the use of hollow glass microbeads as a lightweight filler, which is nevertheless to ensure sufficiently high compressive strength of the cured foam material. Said hollow glass microbeads are also a major component in reducing the weight and in achieving a high compressive strength, since in this way a controlled collapse of the structure of the foam during the compression test or during an accident involving a collision is brought about. The use of hollow glass microbeads nevertheless has some serious disadvantages:

They are expensive and thus increase the cost of the structural foam, since they have to be used on a considerable scale.

Surface-active substances such as silanes or titanates, which, as is known, are used to improve the adhesive properties of the structural foam on the metal substrates, react with the surface of the hollow glass microbeads and hence reduce the effect of the latter at the interface with the substrate. The adhesion properties of the structural foam are thereby impaired considerably, in particular after heat or the build-up of moisture.

The process for manufacturing the structural foams is complicated by the fact that the brittle hollow glass microbeads are pressure- and shear-sensitive, so that compositions that contain hollow glass microbeads may be pumped only at relatively low pressures and also may be extruded or worked by injection moulding only at relatively low pressures. This leads to long process times and hence high production costs. In addition, the destruction of some of the hollow microbeads cannot be entirely excluded, whereby the density of the structural foam decreases in an undesirable manner.

The inventors therefore set themselves the object of replacing the hollow glass microbeads with "neutral" fillers, with which the collision and compressive strength properties of the thermally expanded and cured foam compositions are to remain, and at the same time the efficient use of silanes and titanates and similar compounds for optimizing the adhesion properties is to be possible. In the compression test the desired fracture behaviour is, in a similar way to foams containing the hollow glass microbeads, to be distinguished by the fact that the structural foam does not experience brittle failure under load, but instead the structure is noticeably destroyed with progressive loading and as high a force level as possible may be maintained.

BRIEF SUMMARY OF THE INVENTION

The present invention provides a expandable, thermally curable binder composition which contains
a) at least one liquid epoxy resin,
b) at least one solid epoxy resin,
c) at least one propellant,
d) at least one curing agent,
e) at least one mica-containing filler,
wherein the composition contains no hollow glass beads.

In one embodiment, the expandable, thermally curable composition additionally comprises at least one flexibilizing agent selected from the group consisting of rubber-modified epoxy resins, polyurethane-modified epoxy resins, adducts of amino-terminated polyoxyalkylenes and polyepoxides, adducts of dimeric fatty acid and bisphenol-A-diglycidyl ethers, adducts of polyether polyols and epoxy resins, polysulfide- and polymercaptan-modified epoxy resins, and copolymers of acrylonitrile with butadiene and/or isoprene and optionally (meth)acrylic acid with an acrylonitrile content of between 10 and 50 wt. % and a (meth)acrylic acid content of between 0.0 and 1 wt. %.

Thermally expandable mouldings are produced from the compositions according to the invention preferably by the injection moulding process at the lowest possible temperatures.

In addition, laminates may be produced from the compositions according to the invention by extrusion, roll application methods or injection methods.

The present invention therefore provides mouldings, preferably not tacky, for the reinforcing and stiffening of thin-walled metal components, in particular hollow metal bodies, which are thermally curable, exhibit a high degree of thermal expansion, exhibit a good stiffening and/or reinforcing effect for thin-walled metallic structures, exhibit a high compressive strength in the cured state, may be worked by the moulding method, in particular by the injection mould process, at low temperatures and are preferably applied to a support, are dimensionally stable at temperatures of up to 50° C. after the injection moulding, are transportable without complicated and expensive packaging, and may be manufactured economically both in terms of material costs and manufacturing costs.

The present invention therefore comprises a process for the stiffening and/or reinforcing of car body parts, which contains the following main process steps:

In a first stage the aforementioned binder components are mixed homogeneously at temperatures of less than 110° C. and then transferred into an injection moulding unit. There said binder is injected into an injection mould at temperatures of 60° C. to 110° C., preferably at temperatures of 70° C. to 90° C., under thermostatically controlled conditions. Optionally there is located in said mould a support of metal or thermoplastic materials onto which the expandable binder is sprayed. After this the cooling of the moulding to temperatures of less than 50° C. takes place. On the removal from the mould the surface of the expandable binder is tack-free, so that the expandable mouldings may be packed without special measures and even in the summer withstand long journeys to southern countries problem-free, without the use of refrigerated wagons being required.

For the end application, the expandable moulding is applied to the two-dimensional metal substrate or inserted into the cavity to be stiffened, for example of a vehicle body, and fixed. During the subsequent process heatings of the paint drying ovens the vehicle body, as is known, is brought to temperatures of between 110° C. and 200° C., during which heating the volume of the moulding expands by 50 to 300% and the reaction resin matrix cures to a thermoset.

The present invention therefore provides use of the expandable mouldings for the stiffening and reinforcing of hollow metal structures, in particular of hollow car body parts such as body frames, body supports, body posts and wider joints and gaps between body parts in automobile construction.

The present invention further provides use of the composition according to the invention to provide multilayer laminates for the stiffening of two-dimensional components. Said laminated bodies are furthermore composed of at least one thermally curable expandable layer of the binder composition and at least one layer of a reinforcing agent. Optionally, said laminate may after the assembly be provided on one side with a protective film, which is removed again prior to the application to the substrate to be stiffened. "Flat bodies" or "two-dimensional components" for the purpose of said invention include not only completely planar structures, but also vehicle structures which contain slightly curved or bent areas, such as occur in doors, roof sections, boot lids, engine bonnets and similar components.

The present invention therefore also comprises a process for the stiffening or reinforcement of two-dimensional components of metal or plastics material, which comprises the following main process steps:

a) mixing of the composition constituents at temperatures of less than 110° C.;

b) extrusion of the composition at temperatures of 60° C. to 110° C., preferably 70° C. to 90° C., optionally onto a flat-shaped woven article or metal strip or a support;

c) cooling of the laminate so formed;

d) application of the laminate to the metal substrate optionally with heating to the softening range of the laminate; and e) heating of the substrate to temperatures of between 110° C. and 200° C., preferably between 130° C. and 180° C., during which the reaction resin matrix cures to a thermoset on the substrate.

DETAILED DESCRIPTION OF CERTAIN EMBODIMENTS OF THE INVENTION

The main constituents which are particularly suitable for the production of the mouldings or laminates are described in detail below.

Suitable as epoxy resins are a large number of polyepoxides which have at least two 1,2-epoxy groups per molecule. The epoxy equivalent of said polyepoxides may vary between 150 and 50,000, preferably between 170 and 5000. The polyepoxides may in principle be saturated, unsaturated, cyclic or acyclic, aliphatic, alicyclic, aromatic or heterocyclic polyepoxide compounds. Examples of suitable polyepoxides include the polyglycidyl ethers which are produced by reacting epichlorohydrin or epibromohydrin with a polyphenol in the presence of alkali. Polyphenols suitable for this are, for example, resorcinol, pyrocatechol, hydroquinone, bisphenol A (bis-(4-hydroxy-phenyl)-2,2-propane), bisphenol F (bis(4-hydroxy-phenyl)methane), bis(4-hydroxyphenyl)-1,1-isobutane, 4,4'-dihydroxybenzophenone, bis(4-hydroxyphenyl)-1,1-ethane, 1,5-hydroxynaphthalene.

Other suitable polyphenols as a basis for the polyglycidyl ethers are the known condensation products of phenol and formaldehyde or acetaldehyde of the Novolak resins type.

Other polyepoxides are polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimeric fatty acid.

Other epoxides are derived from the epoxidisation products of olefinically unsaturated cycloaliphatic compounds or from native oils and fats.

Most particularly preferred are the epoxy resins which are derived by reacting bisphenol A or bisphenol F and epichlorohydrin, wherein the liquid epoxy resins are preferably based on bisphenol A and have a sufficiently low molecular weight. The epoxy resins liquid at room temperature have as a rule an epoxy equivalent weight of 150 to about 480, particularly preferred being an epoxy equivalent weight range of 182 to 350.

The epoxy resins solid at room temperature are likewise obtainable from polyphenols and epichlorohydrin, particularly preferred here are those based on bisphenol A or bisphenol F with a melting point of between 45° C. and 90° C., preferably between 50° C. and 80° C. The latter are distinguished from the liquid epoxy resins mainly by their higher molecular weight, whereby the latter become solid at room temperature. According to the invention the solid epoxy resins have an epoxy equivalent weight of $\geq 400$, particularly preferred being an epoxy equivalent weight of 450 to about 900.

There may be used as flexibilizing agents epoxy resins with a flexibilizing effect such as the adducts known per se of carboxyl-terminated butadiene-acrylonitrile-copolymers (CTBN) and liquid epoxy resins based on the diglycidyl ether of bisphenol A. Concrete examples are the reaction products of HYCAR CTBN 1300 X8, 1300 X13 or 1300 X15 from B.F. Goodrich with liquid epoxy resins. In addition, the reaction products of amino-terminated polyalkylene glycols (brand name JEFFAMINE) with an excess of liquid polyepoxides may also be used. Such reaction products are for example disclosed in WO 93/00381. In principle, reaction products of mercapto-functional prepolymers or liquid thiokol-polymers with an excess of polyepoxides may also used as flexibilizing epoxy resins according to the invention. Most particularly preferred, however, are the reaction products of polymeric fatty acids, in particular dimeric fatty acid, with epichlorohydrin, glycidol or in particular diglycidyl ether of bisphenol A (DGBA). In addition, the copolymers of acrylonitrile with butadiene and/or isoprene and optionally (meth)acrylic acid with an acrylonitrile content of between 10 and 50 wt. %, preferably between 20 and 40 wt. %, and a (meth)acrylic acid content of between 0.0 and 1 wt. %, preferably between 0.0 and 0.1 wt. %, are suitable as flexibilizing agents. Mixtures of the above-mentioned flexibilising agents may also be used.

Reactive thinners represent another important constituent of the binder composition according to the invention. Reactive thinners are for the purpose of this invention low-viscosity substances (glycidyl ether or glycidyl ester) containing epoxy groups and with an aliphatic or aromatic structure. Said reactive thinners on the one hand serve for the viscosity reduction of the binder system above the softening point, on the other they control the pre-gelling process in the injection moulding. Typical examples of reactive thinners to be used according to the invention are mono-, di- or triglycidyl ethers of C6 to C14 monoalcohols or alkyl phenols, as well as the monoglycidyl ethers of cashew nut shell oil, diglycidyl ethers of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentane diol, 1,6-hexane diol, cyclohexanedimethanol, triglycidyl ethers of trimethylol propane, and the glycidyl esters of C6 to C24 carboxylic acids or their mixtures.

Since the mouldings or laminates curable according to the invention are of single-component construction and are to be curable under heat, they also contain a latent curing agent and/or additionally one or more accelerators. Guanidines, substituted guanidines, substituted ureas, melamine resins, guanamine derivatives, cyclic tertiary amines, aromatic amines and/or their mixtures may be used as thermally activatable or latent curing agents for the epoxy resin binder system. The curing agents may be incorporated into the curing reaction stoichiometrically, and they may also be catalytically active. Examples of substituted guanidines are methyl guanidine, dimethyl guanidine, trimethyl guanidine, tetramethyl guanidine, methyl isobiguanidine, dimethyl isobiguanidine, tetramethyl isobiguanidine, hexamethyl isobiguanidine, heptamethyl isobiguanidine and most particularly cyanoguanidine (dicyandiamide). Alkylated benzoguanamine resins, benzoguanamine resins or methoximethylethoxy-methylbenzoguanamine may be mentioned as representatives of suitable guanamine derivatives. The selection criterion for the single-component, heat curable binders is naturally the low solubility of said substances at room temperature in the resin system, so that solid, finely ground curing agents have preference here, in particular dicyandiamide is suitable. A good storage stability is guaranteed with it.

Catalytically active substituted ureas may be used in addition to or instead of the aforementioned curing agents. These are in particular p-chlorophenyl-N,N-dimethylurea (monuron), 3-phenyl-1,1-dimethylurea (fenuron) or 3,4-dichlorophenyl-N,N-dimethyurea (diuron). In principle tertiary acryl or alkyl amines, such as e.g. benzyldimethylamine, tris(dimethylamino)phenol, piperidine or piperidine derivatives may also be used, but the latter have in many cases an excessively high solubility in the binder system, so that a useful storage stability of the single-component system is not achieved here. In addition, miscellaneous, preferably solid, imidazole derivatives may be used as catalytically active accelerators. There may be mentioned as representatives 2-ethyl-2-methylimidazole, N-butylimidazole, benzimidazole, as well as N—$C_1$- to $C_{12}$-alkyl imidazoles or N-aryl imidazoles, triazine derivatives and imidazole/triazine compounds (e.g. $C_{11}$—Z-azine, firm Ajinomoto). Combinations of curing agent and accelerator may also be used in the form of so-called accelerated dicyandiamides in finely ground form. The separate addition of catalytically active accelerators to the epoxy curing system thereby becomes superfluous in some cases.

For particularly reactive systems, finely ground powdery curing accelerators based on adducts of amines and epoxy resins may also be used, said adducts possess tertiary amino groups and epoxy groups. Said latent, powdery accelerators may be used in combination with the aforementioned latent curing agents and/or accelerators.

In addition, the binders according to the invention may contain finely divided thermoplastic polymer powders. Said thermoplastic polymer powders may in principle be selected from a large number of finely divided polymer powders, there may be mentioned for example vinyl acetate homopolymer, vinyl acetate copolymer, ethylene vinyl acetate copolymer, vinyl chloride homopolymer (PVC) or copolymers of vinyl chloride with vinyl acetate and/or (meth)acrylates, styrenehomo- or copolymers, (meth)acrylate-homo- or copolymers or polyvinyl butyral. Particularly preferred thermoplastic polymers contain functional groups such as carboxyl groups, carboxylic acid anhydride groups or imidazole groups and have a core/shell structure, in which the shells of said polymers exhibit slight swelling characteristics at room temperature compared with plasticizers or reactive thinners. In the pre-gelling reaction during the mixing and/or extruding, however, said core/shell polymers swell up very quickly and produce immediately after the cooling of the laminate a tackfree surface of the expandable binder layer. Such core/shell polymers are described, for example, in EP 30 999 A1, EP 30590 A1, DE 2 722 752 A1 or U.S. Pat. No. 5,290,857. Said polymer powders are to exhibit a mean core size of below 1 mm, preferably below 350 microns and most particularly preferably below 100 microns.

As a rule the binders according to the invention also contain fillers known per se, such as, e.g., the various ground or precipitated chalks, carbon black, calcium-magnesium carbonates, barytes and silicate fillers of the aluminum-magnesium-calcium silicate type, e.g., wollastonite, chlorite.

According to the invention, it is the aim to use the thermally expandable, heat curable composition for the production of specifically lightweight structures with high compressive strength, whose adhesion characteristics remain stable over a long period even with moisture and heat ageing of the cured structures. They therefore do not contain, in addition to the aforementioned "standard" fillers, any hollow glass beads as lightweight fillers, but preferably mica-containing fillers, particularly preferred here is a so-called 2-component filler of muscovite-mica and quartz with low heavy metal content. There may also be used additionally hollow plastics beads based on phenol resins, epoxy resins or polyesters, expanded hollow microbeads with wall material of (meth)acrylate copolymers, polystyrene, styrene(meth)acrylate copolymers and in particular of polyvinylidene chloride, as well as copolymers of vinylidene chloride with acrylonitrile and/or (meth)acrylates, or organic lightweight materials of natural origin such as ground nut shells, for example the shells of cashew nuts, coconuts or peanut shells, as well as cork powder or coke dust. Particularly preferred are fillers which guarantee, in the cured laminate matrix, a compressive strength of the laminate which is at least as high as those obtained with the known hollow glass beads.

In a particularly preferred embodiment the matrix materials for the heat curable laminates or mouldings contain additionally short fibres based on aramide fibres, carbon fibres, metal fibres (e.g., of aluminum), glass fibres, polyamide fibres, polyethylene fibres or polyester fibres, wherein said fibres are preferably pulp fibres or staple fibres, which have a fibre length of between 0.5 and 6 mm and a diameter of 5 to 20 microns. Particularly preferred here are polyamide fibres of the aramide fibre type or else glass fibres.

In principle all known propellants are suitable as propellants, such as, e.g., the "chemical propellants", which release gases by decomposition, or "physical propellants", i.e. expanding hollow beads. Examples of the first-mentioned propellants are azobisisobutyronitrile, azodicarbonamide, dinitroso-pentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide. Particularly preferred, however, are the expandable hollow plastics microbeads based on polyvinylidene chloride copolymers or acrylonitrile/(meth)acrylate copolymers, these are, e.g., obtainable commercially under the names "Dualite" or "Expancel" from the firms Pierce & Stevens or Casco Nobel.

In addition, the adhesive compositions according to the invention may contain further conventional auxiliary substances and additives such as e.g., plasticisers, reactive thinners, rheological aids, wetting agents, adhesion promoters, in particular organofunctional silanes or titanates, antioxidants, stabilizers and/or pigments. The proportions of the individual components may vary within relatively wide limits according to the range of requirements made of the moulding or laminate in terms of its processing properties, the flexibility, the required stiffening effect and the adhesive bond with the substrates.

Typical ranges for the main components of the binder are:

| | |
|---|---|
| a) thermoplastic polymer powder | 0 to 40 wt. %, preferably 0 to 15 wt. %, |
| b) liquid epoxy resin | 10 to 60 wt. %, preferably 30 to 40 wt. %, |
| c) solid epoxy resin | 2 to 60 wt. %, |
| d) reactive thinner | 0 to 15 wt. %, preferably 1 to 10 wt. %, |
| e) curing agent and accelerator | 1.5 to 5 wt. %, |
| f) propellant | 0 to 3 wt. %, |
| g) mica-containing filler | 5 to 40 wt. %, |
| h) other fillers | 5 to 20 wt. %, |
| i) fibres | 0 to 30 wt. %, |
| j) pigments | 0 to 1 wt. %, | in which the sum of the overall components amounts to 100 wt. %

To produce the binder composition according to the invention, the epoxy resin or resins, the flexibilizing agent, the reactive thinner and optionally the thermoplastic polymer are blended together with the fillers, fibres and pigments in a conventional mixer unit such as a planetary mixer, kneader or similar. The propellant and curing agent and accelerator are then added, wherein the material temperature is not to exceed 110° C., preferably however not 60° C. to 90° C., in particular during and after the addition of propellant and curing agent and/or accelerator.

The binder composition produced in this way may be stored temporarily or be introduced directly into the feeder unit of an injection moulding machine for the production of the mouldings. For the production of the expandable moulding, as a rule a support is then first of all inserted into the injection mould. Said support may consist of metal, for example of zinc-plated steel plate, aluminum or else thermoplastic materials such as polyamide (PA), polyphenylene sulfide (PPS), polyphenylene ether (PPE), polyphenylene sulfone (PPSU) or polyphenylene imide (PPI). In certain cases said supports of thermoplastic materials may also be fibre-reinforced; they are to be distinguished by low water absorption and dimensional stability up to 180° C.

After the closure of the mould, the binder, heated to temperatures of between 60° C. and 110° C., preferably of 70° C. to 90° C., is then injected into the mould, after which the cooling of the moulding and the removal of the moulding take place. The binder is of low viscosity at the above-mentioned temperatures and may therefore easily be conveyed by pumping and pressing at low pressures. The mouldings obtained after the cooling are dimensionally stable and not tacky up to at least 50° C. and do not require for storage any specially produced packaging supporting the mould. The mouldings may therefore also in summer be transported over long distances to the end user in southern countries without the use of refrigerated wagons or refrigerated containers. At the end user, the mouldings are then, depending on the application, either introduced into the cavity to be stiffened and reinforced, or in certain cases the mouldings may be attached to car body parts as early as the initial construction stage, in such a way that in the subsequent fitting processes the cavity is formed only by the fitting of further body parts. In addition, the mouldings according to the invention may be attached to two-dimensional steel parts such as wide joints and/or gaps of body parts. As a rule the mouldings are so dimensioned that they do not fill completely the cavities or joints and gaps in the non-expanded mould, so that the further process fluids such as washing and cleaning baths, phosphatizing and conversion baths, as well as electrophoretic paint, may fully wet the metallic substrate surface. Occasionally so-called "initial construction ovens" with temperatures of up to 140° C. for the pre-gelling of adhesives and sealants are provided in the production lines, in this case the mouldings according to the invention are not yet to expand and cure in the initial construction oven. Only in the subsequent ovens for the curing of the electrophoretic paint does the expansion of the moulding by 50 to 100% take place, at temperatures of between 110° C. and 200° C., preferably between 140° C. and 180° C., and the reaction resin matrix of the binder system simultaneously cures to a thermoset, which then fills the cavities to such an extent that it may exert its stiffening and reinforcing effect.

In the cured and foamed up state the moulding matrix has a compressive strength of 6 to 30 MPa and a compressive modulus of 300 to 1500 MPa and thereby produces a high degree of reinforcement and stiffening despite low specific weight.

The preferred use of the expandable mouldings is as stiffenings and reinforcements of metal parts and/or hollow metallic structures, in particular car body frames, car body supports and the A, B and/or C posts or cavities in doors in the automotive industry.

For the production of the laminates, the binder composition is applied with the aid of an extruder or calender onto a reinforcing agent in the form of a film or a flat textile structure.

There are suitable as films here aluminum foils, steel foils, brass foils or copper foils, which optionally may also be plastic-coated at least on one side. Also suitable are plastic films of polyester, polyamide, polypropylene or polyimide. Suitable as a flat textile, fibre-containing structure are non-woven, woven or knitted fabrics of aramide fibres, carbon fibres, glass fibres, polyamide fibres, polyethylene fibres, polypropylene fibres or polyester fibres.

The elastic, flexible films produced in this way may be further processed to the reactive stiffening or reinforcing laminates by further shaping processes such as punching or cutting. In certain cases the binder side also has to be covered with a protective film, so that said mouldings may be stored or transported problem-free without major expenditure on packaging.

The main application of the laminates according to the invention is the stiffening and the reinforcing of two-dimensional components, in particular of car body components, such as body frames, doors, boot lids, engine bonnets and/or roof parts in the automotive industry.

In the following exemplifying embodiments, the invention is to be explained in more detail, wherein the selection of the examples is not to represent any limitation of the scope of the subject of the invention, they are simply to represent in a specimen manner individual embodiments and advantageous effects of the invention. All the quantities given in the following examples are in parts by weight or weight per cent, unless stated otherwise.

EXAMPLES

The binder compositions listed in the following table were mixed until homogeneous in an evacuatable planet mixer, it being ensured that the temperature of the material did not exceed 70° C.

|  | Example 1 | Example 2 | Example 3 | Example 4 | Example 5 |
|---|---|---|---|---|---|
| Epoxy resin 1[1] | 38.00 |  |  | 38.00 | 38.00 |
| Epoxy resin 2[2] |  | 38.00 | 38.00 |  |  |
| Epoxy resin 3[3] | 5.00 |  |  | 5.00 | 5.00 |
| Epoxy resin 4[4] |  | 7.00 | 7.00 |  |  |
| Modified epoxy resin 1[5] | 15.00 |  |  | 15.00 | 15.00 |
| Modified epoxy resin 2[6] |  | 5.00 | 5.00 |  |  |
| Hollow glass microbeads[7] | 25.20 |  |  | 26.80 | 25.20 |
| Dicyandiamide | 3.00 | 3.00 | 3.00 | 3.00 | 3.00 |
| Accelerator[8] | 1.80 | 1.80 | 1.80 | 1.80 | 1.80 |
| Propellant[9] | 1.20 | 2.00 | 2.00 | 1.60 | 1.60 |
| Thixotropic agent[10] | 3.00 | 3.00 | 3.00 | 1.00 | 1.00 |
| Pigment (carbon black paste) | 0.40 | 0.40 | 0.40 | 0.40 | 0.40 |
| Filler 1[11] | 7.40 |  | 5.00 | 7.40 | 8.60 |
| Filler 2[12] |  | 39.80 | 34.40 |  |  |
| Silane[13] |  |  | 0.10 |  | 0.10 |
| Titanate[14] |  |  | 0.30 |  | 0.30 |
| Total | 100.00 | 100.00 | 100.00 | 100.00 | 100.00 |
| Density (g/cm³), uncured | 0.84 | 1.65 | 1.56 | 0.87 | 0.87 |
| Density (g/cm³), cured | 0.53 | 0.64 | 0.59 | 0.47 | 0.47 |
| Degree of expansion (%) | 56% | 156% | 163% | 85% | 85% |
| Compressive strength 23° C. (MPa) | 32.4 | 25.6 | 20.9 | 24.3 | 23.7 |
| Tensile shear strength H0 (MPa) | 3.3 | 3.14 | 2.67 | 3.73 | 3.97 |
| Tensile shear strength H7 (MPa) | 1.9 | 1.93 | 2.57 | 2.19 | 2.88 |
| Tensile shear strength H21 (MPa) | 1.87 | 1.92 | 2.43 | 2.26 | 2.64 |

Notes:

[1] solid epoxy resin, molecular weight about 880, melting range 50° C. to 62° C., epoxy equivalent weight 475.

[2] solid epoxy resin, melt viscosity at 150° C. about 675 mPa·s, softening range 75° C. to 85° C., epoxy equivalent weight about 510.

[3] liquid epoxy resin based on DGBA, epoxy equivalent weight 250.

[4] liquid/semi-solid epoxy resin based on DGBA, epoxy equivalent weight 240.

[5] epoxy resin based on a DGBA/dimeric fatty acid adduct, epoxy equivalent weight about 550.

[6] monoglycidyl ether of a C12/C14 alcohol, epoxy equivalent weight 314.

[7] SCOTCHLITE VS 5500, compressive strength approx. 38 MPa, firm 3M.

[8] finely ground accelerator (amino adduct of epoxy resin with epoxy and tertiary amino groups).

[9] propellant (hollow plastics beads "Expancel DU 140", firm Pierce & Stevens).

[10] based on polyolefin pulp fibres.

[11] chalk, precipitated.

[12] 2-component filler of muscovite-mica and quartz.

[13] 3-glycidiloxypropyl-trimethoxy silane.

[14] tetraoctyl titanate.

To simulate the injection moulding, the compositions were each pre-gelled for 5 min at 110° C., this corresponds to the pre-gelling in the injection mould of the injection moulding machine. After said pre-gelling, the test specimens were dimensionally stable and had a tack-free surface. To determine the degree of propulsion, the density in the cured state, the compressive strength of the moulding and the shear strength, the mouldings were stoved for 38 min at 150° C.

Examples 2 and 3 listed above are according to the invention, while examples 1, 4 and 5 are comparison examples. Although the examples according to the invention exhibit a higher density in the non-propelled and non-cured state, because of the absence of hollow glass beads, this is more than offset by the substantially higher degree of expansion during the curing process, without a significant reduction in the compressive strength taking place. There is achieved with the examples according to the invention a compressive strength of the foamed mouldings which is comparable with the prior art. When silanes and titanates are added (Example 3), the tensile shear strength is also largely maintained after both 7-day (H 7) and 3-week (H 21) moisture/heat ageing, while with the compositions according to the prior art, in particular during the longer moisture/heat ageing, a significant reduction in the tensile shear strength compared with the initial value (H 0) is observed. In addition, the compositions according to the invention exhibit a lower shear sensitivity, so that no elaborate precautionary measures have to be taken during manufacture of the mixtures or during their conveyance in pumps and extruders.

What is claimed is:

1. An expandable, thermally curable composition comprising
   a) at least one liquid epoxy resin;
   b) at least one solid epoxy resin;
   c) at least one propellant;
   d) at least one curing agent; and
   e) a 2-component filler of muscovite-mica and quartz;
   wherein the composition contains no hollow glass beads.

2. The expandable, thermally curable composition according to claim 1, additionally comprising at least one flexibilizing agent.

3. The expandable, thermally curable composition according to claim 2, wherein said at least one flexibilizing agent is selected from the group consisting of rubber-modified epoxy resins, polyurethane-modified epoxy resins, adducts of amino-terminated polyoxyalkylenes and polyepoxides, adducts of dimeric fatty acid and bisphenol-A-diglycidyl ethers, adducts of polyether polyols and epoxy resins, polysulfide- and polymercaptan-modified epoxy resins, and copolymers of acrylonitrile with butadiene and/or isoprene and optionally (meth)acrylic acid with an acrylonitrile content of between 10 and 50 wt. % and a (meth)acrylic acid content of between 0.0 and 1 wt. %.

4. The expandable, thermally curable composition according to claim 1, additionally comprising f) at least one reactive thinner.

5. The expandable, thermally curable composition according to claim 4, wherein said at least one reactive thinner is selected from the group consisting of a) monoglycidyl ethers of C6 to C14 monoalcohols, cashew nut shell oil, and alkyl phenols, b) diglycidyl ethers of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentane diol, 1,6-hexane diol, cyclohexanedimethanol, c) triglycidyl ethers of trimethylol propane, and d) glycidyl esters of C6 to C24 carboxylic acids.

6. The expandable, thermally curable composition according to claim 1, wherein said at least one liquid epoxy resin or at least one solid epoxy resin comprises a glycidyl ether of a polyphenol.

7. The expandable, thermally curable composition according to claim 1, wherein said at least one curing agent comprises dicyandiamide in an amount of up to 5 wt. % based on the overall composition.

8. The expandable, thermally curable composition according to claim 1, additionally comprising g) at least one thermoplastic polymer powder selected from the group consisting of vinyl acetate homo- and copolymers, ethylene vinyl acetate copolymers, vinyl chloride homo- and copolymers, styrene homo- and copolymers, (meth)acrylate homo- and copolymers and polyvinyl butyral, wherein said at least one thermoplastic polymer powder has a mean particle size of less than 1 mm.

9. The expandable, thermally curable composition according to claim 1, additionally comprising h) at least one further filler selected from the group consisting of hollow plastic beads based on phenol resins, epoxy resins, or polyesters; an hollow microbeads with wall material of (meth)acrylate copolymers, polystyrene, styrene(meth)acrylate copolymers, polyvinylidene chloride, copolymers of vinylidene chloride with acrylonitrile and/or (meth)acrylates; and organic light-weight fillers of native origin.

10. The expandable, thermally curable composition according to claim 1, wherein said at least one propellant comprises expandable hollow microbeads.

11. The expandable, thermally curable composition according to claim 1, additionally comprising Wfibres selected from the group consisting of aramide fibres, carbon fibres, metal fibres, glass fibres, polyamide fibres, polyethylene fibres and polyester fibres.

12. The expandable, thermally curable composition according to claim 1 comprising the following components:
   a) 10 to 60 wt. % liquid epoxy resin;
   b) 2 to 60 wt. % solid epoxy resin;
   c) not more than 3 wt. % of propellant;
   d) 1.5 to 5 wt. % of curing agent, wherein said curing agent further comprises an accelerator;
   e) 5 to 40 wt. % of 2-component filler of muscovite-mica and quartz;
   f) optionally up to 15 wt. % reactive thinner;
   g) optionally up to 40 wt. % thermoplastic polymer powder;
   h) optionally up to 20 wt. % of other fillers;
   i) optionally up to 30 wt. % fibres; and
   j) optionally up to 1 wt. % pigments;
in which the sum of the components amounts to 100 wt %.

13. A process of forming a laminate used to stiffen and reinforce a substrate, said process comprising the steps of:
   a) mixing components (a)-(e) of the composition according to claim 1 at temperatures of less than 110° C.;
   b) extruding the composition according to claim 1 at temperatures of 60° C. to 110° C., onto a reinforcing agent in the form of a film or a flat textile structure;
   c) cooling the extruded composition; and
   d) Optionally applying a protective film to the extruded composition.

14. A laminate produced by the process of claim 13, wherein said extruded composition is tacky at room temperature on at least one side and is stackable at temperatures of up to 50° C. without change in size and form.

15. A process of stiffening and reinforcing a substrate with a laminate of claim 14, said process comprising the steps of:

e) removing the protective film, if present;

f) applying the extruded composition to the substrate, optionally with heating to the softening range of the extruded composition; and g) heating the substrate to temperatures of between 110° C. and 200° C. during which the volume of the extruded composition expands and cures to a thermoset on the substrate.

16. The process of claim 15 wherein said substrate is a car body component.

17. A stiffened and reinforced substrate produced by the process of claim 15, wherein the substrate is a vehicle component or metallic component.

18. A process of forming a molding used to stiffen and reinforce a cavity of a car body component, said process comprising the steps of:

a) mixing components (a)-(e) of the composition according to claim 1 at temperatures of less than 110° C.;

b) injection molding the composition according to claim 1 at temperatures of 60° C. to 110° C., optionally onto a support, to form a molding; and c) cooling the molding.

19. A molding produced by the process of claim 18, wherein said molding is not tacky at room temperature after step (c).

20. The molding according to claim 19 wherein said optional support is present and selected from the group consisting of zinc-plated steel plate, aluminum, thermoplastic materials, and fibre-reinforced thermoplastic materials.

21. A process of stiffening and reinforcing a car body component having a cavity with the molding of claim 19, said process comprising the steps of d) inserting the molding into the cavity, optionally with heating to the softening range of the molding; and e) heating to temperatures of between 110° C. and 200° C., during which the volume of the molding expands by 50 to 250% and cures to a thermoset.

22. A stiffened and reinforced cavity of a car body component produced by the process of claim 21.

* * * * *